May 26, 1925.  1,539,020
E. PAPASTEFANOU
GASOLINE STRAINER
Filed Sept. 27, 1924
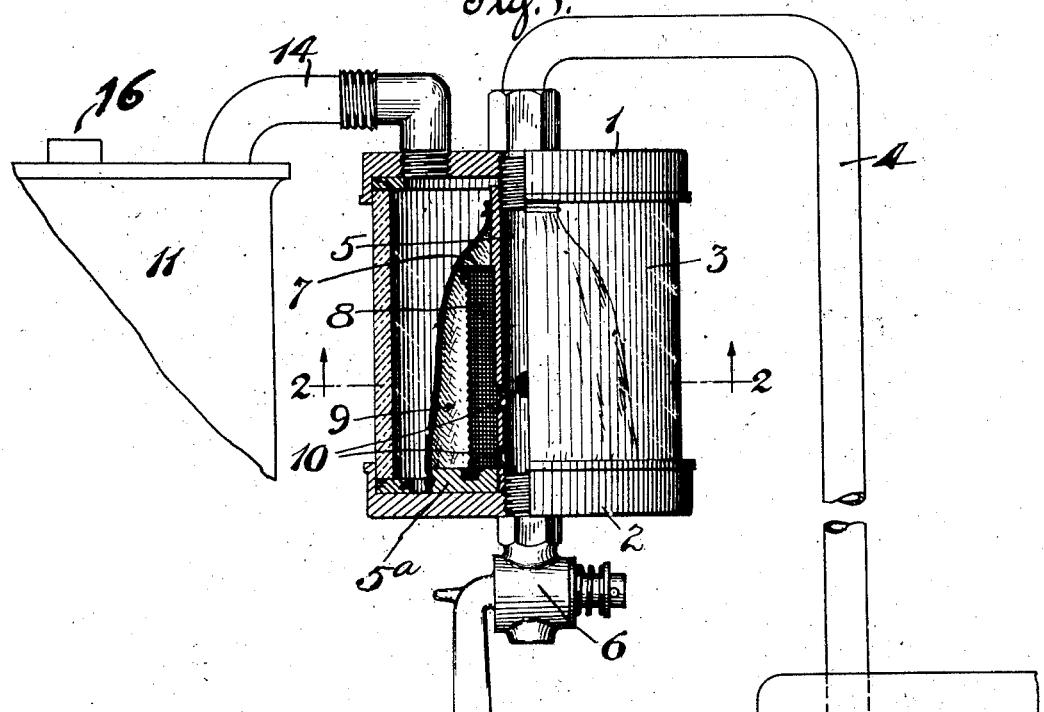
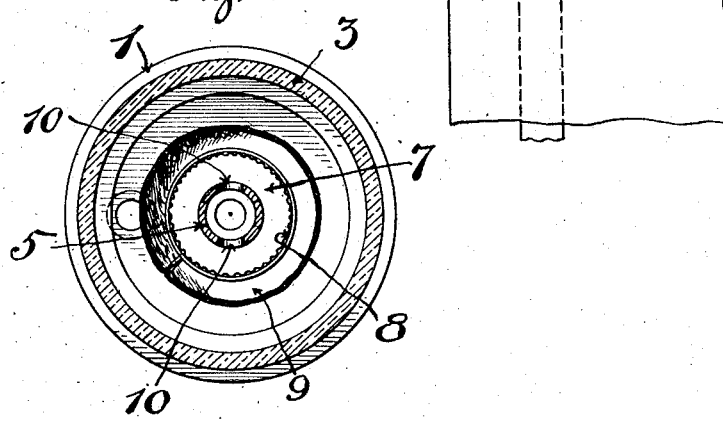
INVENTOR
Emanuel Papastefanou
BY
Mitchell Brothers
ATTORNEYS.

Patented May 26, 1925.

1,539,020

UNITED STATES PATENT OFFICE.

EMANUEL PAPASTEFANOU, OF MOUNT VERNON, NEW YORK, ASSIGNOR TO PERFECTION GAS FILTER CORPORATION, OF MOUNT VERNON, NEW YORK, A CORPORATION OF NEW YORK.

GASOLINE STRAINER.

Application filed September 27, 1924. Serial N ɔ. 740,207.

*To all whom it may concern:*

Be it known that I, EMANUEL PAPASTEFANOU, a citizen of Greece, residing at 141 South 3rd Ave., Mount Vernon, New York, have invented a new and useful Gasoline Strainer, of which the following is a specification.

My invention relates to certain new and useful improvements in gasoline strainers, which improvements are of particular utility when employed in a gasoline feed line leading from a main supply tank to the carbureter of an internal combustion engine, the purpose of the strainer being to filter out water and other impurities in the fuel before it reaches said carbureter. While the strainer may be applied in various ways, it is of particular utility when employed with what is known as a "vacuum" feed system which uses a secondary tank functioning in connection with the suction pressure of an engine to draw gasoline up from a main supply tank and into said vacuum tank, which latter is positioned above the carbureter of the engine, so that gasoline therein may flow by gravity therefrom down to the carbureter. These vacuum tank constructions are well known and in very general use, and therefore need not be explained in detail herein. Suffice it to say that in such tanks, valves are provided to put the interior alternately in communication with a vacuum and atmosphere. When used in this connection, my improved strainer has a self-clearing action, which has many advantages, as will later appear.

In the accompanying drawings, in which I show a preferred form of the invention:

Fig. 1 is a side elevation, partly in section, of my strainer together with parts of the fuel feed system shown in outline.

Fig. 2 is a section on the line 2—2 of Fig. 1.

I will first describe the strainer itself as shown in the drawings.

1—2 represents the upper and lower ends of the strainer casing, which ends are preferably made of metal. 3 represents a cylindrical side wall, which makes a gas-tight joint with the end members 1 and 2, so as to form a clʻsure capable of holding gasoline. The side wall 3 is preferably made of thick glass, although this is not essential. 4 is a gasoline supply pipe, which leads into the top 1, preferably near the center. 5 is a tube communicating with pipe 4. This tube 5 may have threaded ends and may be used as shown to tie together the ends 1 and 2. The lower end of the tube 5 is preferably internally and externally threaded. On the outer thread is mounted a washer-like piece 5ª, for the purpose hereinafter described. 6 is a pet cock, the threaded end of which engages the inside thread of the tube 5 at its lower end, so that it may assist in securing the parts of the casing together, as well as act as a drain for the casing. Mounted on the upper part of the tube 5 is a washer-shaped piece 7, which has a depending annular flange. 8 is a tubular screen of fine wire mesh, one end of which rests within the flange of the washer 7, while the lower end of said screen projects into a positioning groove or pocket in the upper face of the washer 5. 9 is a tube of chamois or the like, the lower part of which is secured in an annular groove in the periphery of the washer 5, while the upper part envelops the screen 8 and washer 7 and tightly fits around the upper end of the tube 5. The function of the screen 8 is to check the passage therethrough of solid particles, while the function of the chamois is to prevent the passage of water through the strainer on its way to the engine. In the side wall of the tube 5, and preferably at and near the lower end, are one or more holes 10.

11 represents conventionally a portion of a so-called "vacuum" feed tank which, in common practice, is placed above the level of an engine carbureter (not shown) and constitutes a service tank. 12 represents a portion of a main supply tank, which is usually located on the rear of an automobile at a lower level than the "vacuum" tank. The function of the latter is to draw a supply of fuel up from the tank 12 so that it may flow by gravity from the "vacuum" tank to the carbureter. The upper end of the service tank 11 is connected by a service pipe 14 to the head 1 of the strainer housing, the connection preferably being rigid, so that said strainer may be conveniently supported by and next to said "vacuum" tank.

Operation: The operation of my new strainer in the system which I have elected to show herein will be as follows: When suction pressure is created in the "vacuum" tank 11 it will create a partial vacuum in the strainer chamber, thus causing gasoline in the main supply tank 12 to flow up through pipe 4 and thence through pipe 5 and holes 10 into the strainer. As the strainer casing is filling up, the gas must pass through the filtering elements 9 and 10, which function to check any impurities therein, whereby gasoline flowing from the strainer elements to the vacuum tank will be clear and clean. After a sufficient quantity of gasoline has been drawn into the "vacuum" tank a vent valve, conventionally indicated at 16, will be automatically opened in the usual manner, which will have the effect of breaking the partial vacuum. When this occurs the movement of gasoline through the strainer will be reversed and the same, by siphonic action, will flow back to the supply tank 12, the clear gasoline passing through the straining and filtering elements 8—9 in a reverse direction, operating to clear the same. The extent to which the filtering chamber is actually emptied depends, of course, upon the height of the uppermost opening 10 in tube 5. It is preferred that a small amount of gasoline shall remain in the filtering chamber during the period that the vent valve 16 is open. Thus, the user may, at such a time, open the pet cock 6 and draw off from the space within the filtering elements 8 and 9 any impurities that may have been deposited therein.

From the foregoing it will be apparent that in one operation the gasoline passes through the filtering elements in one direction for the purpose of catching and restraining any impurities, whereas, in the reverse operation, the gasoline passes through the filtering elements in an opposite direction to dislodge any impurities that may have been lodged on the filtering elements, which impurities may either fall to the bottom of the strainer casing or be carried back into the main supply tank 12. Since it is well known that water accumulating on the surface of chamois will render it impervious to the passage of gasoline in one direction, this self-clearing function is of great value and importance. In ordinary strainers employing a chamois filtering element, it frequently happens that after a comparatively short period of use one wall of the chamois becomes so covered with water and other impurities that gasoline will not flow freely therethrough, and it is necessary, at frequent intervals, to open the strainer, remove the chamois, squeeze out the water and dry the same, so that it may be restored to a usable condition. By my improved construction it is rarely, if ever, necessary to remove either filtering element, because the self-clearing action, which occurs alternately with every filtering action, serves to keep these elements in an efficient condition for an indefinitely long period.

From the foregoing it will be apparent that my invention relates not alone to a novel form of gasoline strainer, but also to a system involving correlated parts, so arranged that the filtering elements themselves are automatically cleared from objectionable accumulations which, if allowed to build up, would tend to impair the filtering efficiency of the same in a comparatively short time.

I have not attempted to describe all of the minor details of construction, nor have I attempted to illustrate such modifications as I apprehend may be made without departing from the spirit or scope of the invention, since such modifications and changes will readily suggest themselves to mechanics skilled in the art, from an examination of my drawings and a reading of the foregoing description. For this reason I wish it understood that the appended claims are intended to cover and include all modifications and arrangements that embody in substance those features of novelty and utility which characterize my invention.

By the term "gasoline" I mean, of course, to include any liquid fuel that is suitable for use in the apparatus described.

I claim:

1. In a gasoline strainer, a housing comprising a top piece, a bottom piece and a cylindrical glass side piece interposed between the top and bottom and held thereby, an upright tube connecting the top and bottom pieces and having a side opening near the lower end thereof, a cylindrical filtering means surrounding the tube and extending from the bottom of the housing to a point near to the top thereof, said filtering means being spaced away from the tube and from the side wall of the housing, a supply inlet leading into the upper end of the tube, a service outlet leading through the top from the space outside of said filtering means, and a drain connected to the bottom of the housing in communication with the space within said filtering means.

2. In a gasoline strainer, a housing comprising a top piece, a bottom piece and a cylindrical glass side piece interposed between the top and bottom and held thereby, an upright tube connecting the top and bottom pieces and having a side opening near the lower end thereof, a cylindrical filtering means surrounding the tube and extending from the bottom of the housing to a point near to the top thereof, said filtering means being spaced away from the tube and from the side wall of the housing, a supply inlet leading into the upper end of the tube, a service outlet leading through the top from the space outside of said filtering means, and a drain connected to the bottom of the housing in communication with the space within said filtering means, said filtering means comprising a chamois and a tubular screen within said chamois.

EMANUEL PAPASTEFANOU.